2,964,155
CONVEYOR

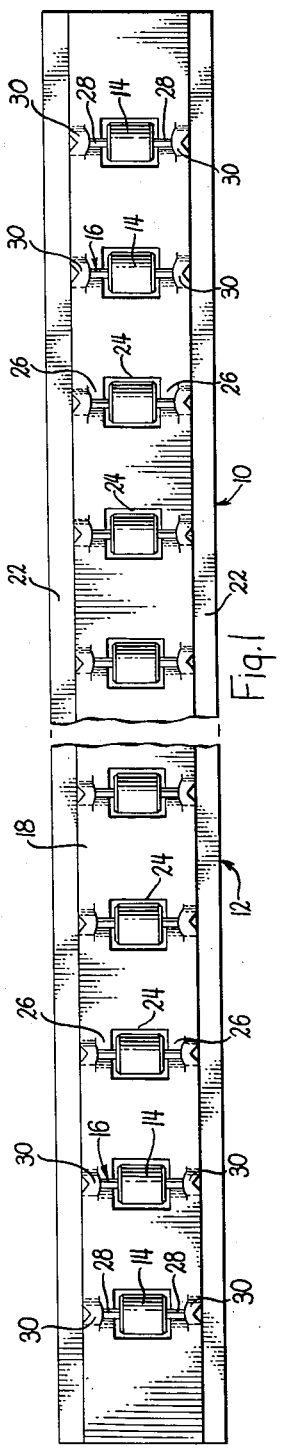
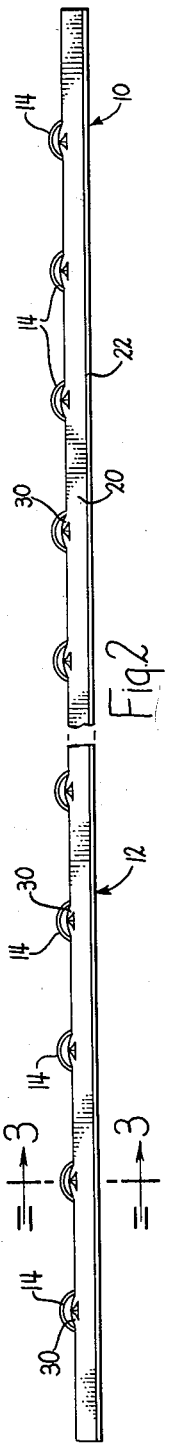
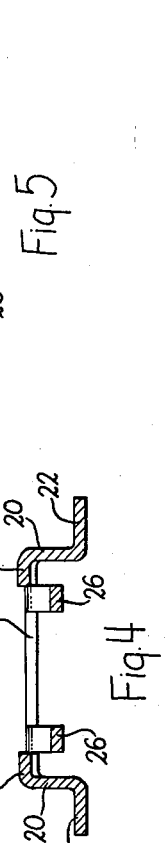
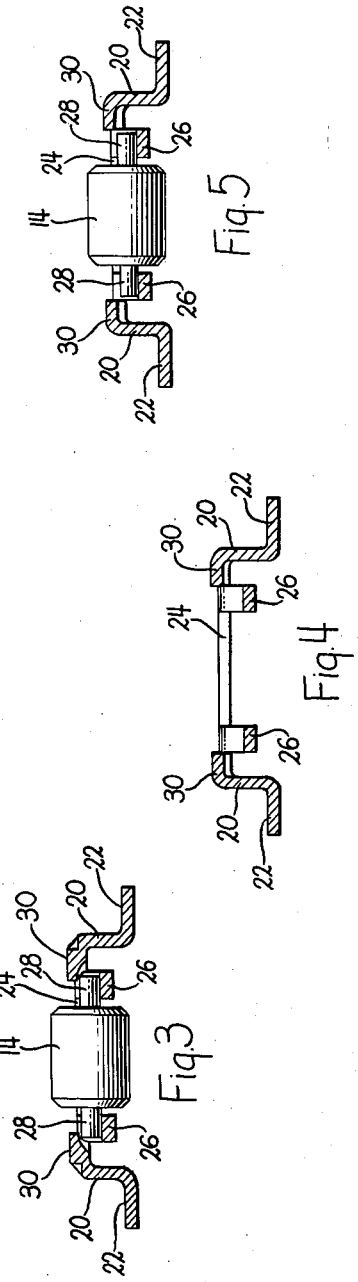
INVENTORS
LEONARD B. FLOWERS &
BY VINCENT F. OKUNIEWSKI
ATTORNEY United States Patent Office 2,964,155
Patented Dec. 13, 1960

Leonard B. Flowers, Detroit, Mich. (506 S. Cranbrook Cross Road, Birmingham, Mich.), and Vincent F. Okuniewski, Hamtramck, Mich. (5136 Gerald, Warren, Mich.)

Filed Dec. 26, 1958, Ser. No. 783,021

6 Claims. (Cl. 193—35)

This invention pertains to a conveyor for movement of materials and more particularly to a conveyor formed of a channel member.

The invention comprises generally a channel member having integrally formed outwardly directed flanges at the edges of the channel legs, a plurality of shaft supported rollers arranged in cradle seats adjacent parallel slots cut in the web of the channel, and caps over the ends of the roller shafts formed from the channel web by striking the same over the roller shafts.

The advantages of the conveyor construction heredisclosed include obvious economic benefits in the use of a minimum of parts and material, simplicity of construction, and economies in tooling and fabrication.

It is an object of the invention to provide a conveyor for movement of materials formed of a channel member provided optionally with outwardly directed flanges at the edges of the channel legs. Another object is the provision of a slotted channel web with shaft supporting cradles formed integrally in the channel web. A further object is the provision of caps for the roller shafts formed integrally in the channel web. The provision of fabricating and economic advantages in the construction constitute yet further objects of the invention.

These and additional objects of the invention and features of construction will appear more clearly from the description given below, in which the terms used are for purposes of description and not of limitation.

Referring now to the drawing annexed hereto forming an integral part of this specification, Fig. 1 is a plan view of a conveyor section embodying the inventive construction.

Fig. 2 is a side elevational view of the conveyor section shown in Fig. 1.

Fig. 3 is a vertical sectional view, slightly enlarged, taken substantially on the line 3—3 of Fig. 2.

Fig. 4 is a vertical sectional view, similar to Fig. 3, showing the conveyor channel slotted and formed to receive the conveyor roller.

Fig. 5 is a vertical sectional view, similar to Fig. 3, with the roller and shaft seated in the channel prior to being rotatably secured therein.

As shown in the several views of the drawing and particularly in Figs. 1 and 2, the conveyor 10 is preferably, but not exclusively, formed in sections of a definite length. These conveyor sections 10 may be secured together in longitudinal and/or parallel alignment as desired or required for service in a particular application.

The conveyor 10 comprises a channel member 12, and a plurality of rollers 14 mounted on shafts 16.

The conveyor channel 12 is provided with a web or body 18 at the side edges of which are two parallel depending legs 20. Optionally, for purposes of further stability and/or support, the legs 20 may also have outwardly directed flanges 22 substantially parallel to the web 18.

The web 18 is provided with a plurality of spaced parallel transverse slots 24 to receive the rollers 14. Adjacent each slot and on either side thereof are formed depressed cradle seats 26, 26 which lie somewhat below the plane of the web 18, in some instances a distance slightly greater than the diameter of the roller shaft 16.

After the rollers 14 have been mounted upon their respective shafts 16, the mounting being either fixed or rotatable in character, the ends 28, 28 of each shaft are placed upon cradle seats 26, 26 with the roller 14 positioned therebetween in the web slots 24.

To secure the roller 14 and shaft 16 in the channel 12, the web portions 30, 30 adjacent the cradle seats 26, 26 and to each side thereabove are indented laterally toward each other to positions over and capping the outer ends 28, 28 of the roller shaft 16, as shown clearly in Fig. 3.

Optionally, the web portions 30, 30 may be left in the plane of the web 18 or may be raised slightly in crown fashion when the cradle seats 26, 26 are being formed. By raising the web portions 30, 30 slightly as crowns over the shaft ends 28, 28, the rollers 14 are allowed to ride higher on the cradle seats and thus raise the rollers, in the plane passed through the top edges of the rollers 14, with respect to the plane of the web 18.

It will be noted that the upper horizontal surface lines of the rollers 14, as shown particularly in Figs. 2, 3 and 5, lie in a plane above the plane of web 18. Thus materials and loads moved over and by the conveyor 10 do not come into bearing contact with the web 18.

In operation, the channel 12 is placed in a machine provided with a set of tools which punch out the slots 24 and form the cradle seats 26, 26 adjacent each slot simultaneously. Thereafter, the rollers 14 are mounted upon shafts 16, either rotatably or in fixed relationship, and each assembled roller and shaft is placed in a slot 24, the shaft ends 28, 28 resting in the cradle seats 26, 26. The channel web portions 30, 30 at each side of the slot 24 are then indented laterally to position the web portions 30, 30 over and in capping relationship upon the shaft ends 28, 28. The rollers 14 rotatable within slots 24 are thus securely held in channel 12 by the capping web portions 30, 30 and the cradle seats 26, 26. The side legs 20 of the channel 12 provide the limits of lateral movement possible for shaft 16. In actual practice, the shaft ends 28, 28 come into lateral limiting contact with the indented portions 30, 30 before they can reach the channel legs 20.

The several parts of the conveyor 10, the channel 12, rollers 14 and shafts 16, are preferably made of metal. However, all or some of these parts may be made of molded or extruded plastics including the polyvinyl resins, epoxy resins, styrenes and other similar suitable materials.

The conveyor 10 is especially suitable for use in handling the discharge of metal blanks, punch outs and scrap from presses and other metal fabricating equipment.

Having described the invention in its simplest terms, it is to be understood that the features of construction may be changed and varied in greater or lesser degree without departing from the essence of the invention defined in the appended claims.

We claim:

1. In a roller conveyor, a channel member having a web disposed above a plane of rest, the legs of said channel member depending from said web, said web having a plurality of spaced openings therethrough intermediate adjacent roller seats depressed below the plane of said web, a shaft mounted roller horizontally disposed in each of said openings, the ends of said shaft resting on said cradle seats, the length of said roller shaft being less than the overall distance between the outer ends of said spaced depressed cradle seats, and web portions adjacent said cradle seats at the outer sides thereof disposed in capping relationship over the outer ends of said shaft below a plane passed through the upper edges of said rollers.

2. In a roller conveyor, a channel member having a web, legs depending from said web supported on a rest plane, said web having a plurality of spaced parallel openings therethrough and roller cradle seats adjacent each of said openings at either side thereof integrally formed from said web and depressed below the plane of said web, a shaft mounted roller horizontally disposed in each of said openings, the ends of said shaft resting on said cradle seats below the plane of said web the length of said roller shaft being less than the overall distance between the outer ends of said spaced depressed cradle seats, and web portions adjacent said cradle seats at the outer sides thereof disposed in capping relationship over the outer ends of said shaft below a plane passed through the upper horizontal surface lines of said rollers.

3. In a roller conveyor, an elongated channel member having a web, legs depending from said web terminating at their edges in laterally extending flanges, said web having a plurality of spaced parallel transverse openings therethrough and roller cradle seats adjacent each of said openings at either side thereof integrally formed from said web and depressed below the plane of said web, a plurality of rollers, a shaft for each of said rollers disposed axially therethrough, a shaft mounted roller horizontally disposed in each of said openings, the ends of said shaft resting on said cradle seats below the plane of said web the length of said roller shaft being less than the overall distance between the outer ends of said spaced depressed cradle seats, and web portions adjacent said cradle seats at the outer sides thereof disposed in capping relationship over the outer ends of said shaft below a plane passed through the upper horizontal surface lines of said rollers.

4. In a roller conveyor, an elongated channel member having a web, legs depending from said web at either side thereof terminating at their edges in laterally extending flanges, said web having a plurality of spaced transverse parallel openings therethrough and roller cradle seats adjacent each of said openings at either side thereof integrally formed from said web and depressed below the plane of said web, a plurality of rollers, a shaft for each of said rollers disposed axially therethrough, a shaft mounted roller horizontally disposed in each of said openings, web portions adjacent said cradle seats at the outer sides thereof being disposed above the plane of said web, the ends of said shaft resting on said cradle seats below the plane of said web portions, the length of said roller shaft being less than the overall distance between the outer ends of said spaced depressed cradle seats, said web portions being disposed in capping relationship over the outer ends of said shaft below a plane passed through the upper horizontal surface lines of said rollers.

5. The construction defined in claim 4, and in which each of said rollers is rotatably mounted on said shafts.

6. The construction defined in claim 4, and in which each of said rollers is fixedly mounted on said shafts.

References Cited in the file of this patent
UNITED STATES PATENTS

| | | |
|---|---|---|
| 2,457,407 | Sebastian | Dec. 28, 1948 |
| 2,778,480 | Dobbins | Jan. 22, 1957 |
| 2,827,153 | Olk et al. | Mar. 18, 1958 |